(12) United States Patent
Cideciyan et al.

(10) Patent No.: US 8,495,470 B2
(45) Date of Patent: Jul. 23, 2013

(54) EFFICIENT REWRITE TECHNIQUE FOR TAPE DRIVES

(75) Inventors: Roy Daron Cideciyan, Rueschlikon (CH); Thomas Mittelholzer, Zurich (CH); Kenji Ohtani, Fujisawa (JP); Paul J Seger, Tucson, AZ (US); Keisuke Tanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/849,743

(22) Filed: Aug. 3, 2010

(65) Prior Publication Data

US 2012/0036318 A1 Feb. 9, 2012

(51) Int. Cl.
*G11C 29/00* (2006.01)
(52) U.S. Cl.
USPC ................................. 714/771; 360/31; 360/53
(58) Field of Classification Search
USPC ....................... 714/771; 360/31, 53
See application file for complete search history.

(56) References Cited

U.S. PATENT DOCUMENTS

| | | | | |
|---|---|---|---|---|
| 4,357,702 A * | 11/1982 | Chase et al. | ................... | 714/700 |
| 5,995,306 A * | 11/1999 | Contreras et al. | ............... | 360/31 |
| 6,266,201 B1 * | 7/2001 | Dahlerud et al. | ............... | 360/53 |
| 7,113,691 B1 * | 9/2006 | Brandsma | ..................... | 386/263 |
| 2007/0041117 A1 * | 2/2007 | Saliba | .............................. | 360/53 |

OTHER PUBLICATIONS

Standard ECMA-319, Standardizing Information and Communication Systems, Data Interchange on 12,7 mm 384-Track Magnetic Tape Cartridges—Ultrium-1 Format, Jun. 2001, http://www.ecma.ch.

* cited by examiner

*Primary Examiner* — Philip Guyton
(74) *Attorney, Agent, or Firm* — Nelson and Nelson; Daniel P. Nelson; Alexis V. Nelson

(57) ABSTRACT

A method for efficiently rewriting data to tape is disclosed herein. In one embodiment, such a method includes writing a data set to tape, the data set comprising S sub data sets of fixed size, each sub data set comprising N code word interleaves (CWIs). The method further includes reading the data set while writing it to the tape to identify faulty CWIs. While reading the data set, the method buffers the faulty CWIs (such as by storing, identifying, and/or marking the faulty CWIs) for later retrieval. When the end of the data set is reached, the method writes corrected versions of the faulty CWIs to the end of the data set. A corresponding apparatus is also disclosed and claimed herein.

20 Claims, 12 Drawing Sheets

| CWI Set | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 2 | 4 | 6 | 8 | 10 | 12 | 14 | 16 | 18 | 20 | 22 | 24 | 26 | 28 | 30 |
| 1 | 1 | 3 | 5 | 7 | 9 | 11 | 13 | 15 | 17 | 19 | 21 | 23 | 25 | 27 | 29 | 31 |
| 2 | 18 | 20 | 22 | 24 | 26 | 28 | 30 | 0 | 2 | 4 | 6 | 8 | 10 | 12 | 14 | 16 |
| 3 | 19 | 21 | 23 | 25 | 27 | 29 | 31 | 1 | 3 | 5 | 7 | 9 | 11 | 13 | 15 | 17 |
| 4 | 4 | 6 | 8 | 10 | 12 | 14 | 16 | 18 | 20 | 22 | 24 | 26 | 28 | 30 | 0 | 2 |
| 5 | 5 | 7 | 9 | 11 | 13 | 15 | 17 | 19 | 21 | 23 | 25 | 27 | 29 | 31 | 1 | 3 |
| 6 | 22 | 24 | 26 | 28 | 30 | 0 | 2 | 4 | 6 | 8 | 10 | 12 | 14 | 16 | 18 | 20 |
| 7 | 23 | 25 | 27 | 29 | 31 | 1 | 3 | 5 | 7 | 9 | 11 | 13 | 15 | 17 | 19 | 21 |
| 8 | 8 | 10 | 12 | 14 | 16 | 18 | 20 | 22 | 24 | 26 | 28 | 30 | 0 | 2 | 4 | 6 |
| 9 | 9 | 11 | 13 | 15 | 17 | 19 | 21 | 23 | 25 | 27 | 29 | 31 | 1 | 3 | 5 | 7 |

Fig. 9

| CWI Set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | 0 | 2 | 4 | 6 | 8 | 10 | 12 | 14 | 16 | 18 | 20 | 22 | 24 | 26 | 28 | 30 | 32 | 34 | 36 | 38 | 40 | 42 | 44 | 46 | 48 | 50 | 52 | 54 | 56 | 58 | 60 | 62 |
| 1 | 1 | 3 | 5 | 7 | 9 | 11 | 13 | 15 | 17 | 19 | 21 | 23 | 25 | 27 | 29 | 31 | 33 | 35 | 37 | 39 | 41 | 43 | 45 | 47 | 49 | 51 | 53 | 55 | 57 | 59 | 61 | 63 |
| 2 | 34 | 36 | 38 | 40 | 42 | 44 | 46 | 48 | 50 | 52 | 54 | 56 | 58 | 60 | 62 | 0 | 2 | 4 | 6 | 8 | 10 | 12 | 14 | 16 | 18 | 20 | 22 | 24 | 26 | 28 | 30 | 32 |
| 3 | 35 | 37 | 39 | 41 | 43 | 45 | 47 | 49 | 51 | 53 | 55 | 57 | 59 | 61 | 63 | 1 | 3 | 5 | 7 | 9 | 11 | 13 | 15 | 17 | 19 | 21 | 23 | 25 | 27 | 29 | 31 | 33 |
| 4 | 4 | 6 | 8 | 10 | 12 | 14 | 16 | 18 | 20 | 22 | 24 | 26 | 28 | 30 | 32 | 34 | 36 | 38 | 40 | 42 | 44 | 46 | 48 | 50 | 52 | 54 | 56 | 58 | 60 | 62 | 0 | 2 |
| 5 | 5 | 7 | 9 | 11 | ... | ... | ... | ... | ... | ... | ... | ... | ... | ... | ... | ... | ... | ... | ... | ... | ... | ... | ... | ... | ... | ... | ... | ... | ... | ... | 1 | 3 |
| 189 | 60 | 62 | 0 | 2 | 4 | 6 | 8 | 10 | 12 | 14 | 16 | 18 | 20 | 22 | 24 | 26 | 28 | 30 | 32 | 34 | 36 | 38 | 40 | 42 | 44 | 46 | 48 | 50 | 52 | 54 | 56 | 58 |
| 190 | 31 | 33 | 35 | 37 | 39 | 41 | 43 | 45 | 47 | 49 | 51 | 53 | 55 | 57 | 59 | 61 | 63 | 1 | 3 | 5 | 7 | 9 | 11 | 13 | 15 | 17 | 19 | 21 | 23 | 25 | 27 | 29 |
| 191 | 30 | 32 | 34 | 36 | 38 | 40 | 42 | 44 | 46 | 48 | 50 | 52 | 54 | 56 | 58 | 60 | 62 | 0 | 2 | 4 | 6 | 8 | 10 | 12 | 14 | 16 | 18 | 20 | 22 | 24 | 26 | 28 |

900b → Track

Fig. 10

| CWI Set | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 9 | 10 | 11 | 12 | 13 | 14 | 15 | 0 | 1 | 2 | 3 | 4 | 5 | 6 | 7 | 8 |
| 2 | 2 | 3 | 4 | 5 | 6 | 7 | 8 | 9 | 10 | 3 | 12 | 13 | 14 | 15 | 0 | 1 |
| 3 | 11 | 12 | 13 | 14 | 15 | 0 | 1 | 2 | 3 | 4 | 5 | 6 | 7 | 8 | 9 | 10 |
| 4 | 4 | 5 | 6 | 7 | 8 | 9 | 10 | 11 | 12 | 13 | 14 | 15 | 0 | 1 | 2 | 3 |
| 5 | 13 | 14 | 15 | 0 | 1 | 2 | 3 | 4 | 5 | 6 | 7 | 8 | 9 | 10 | 11 | 12 |
| 6 | 6 | 7 | 8 | 9 | 10 | 11 | 12 | 13 | 14 | 15 | 0 | 1 | 2 | 3 | 4 | 5 |
| 7 | 15 | 0 | 1 | 2 | 3 | 4 | 5 | 6 | 7 | 8 | 9 | 10 | 11 | 12 | 13 | 14 |
| 8 | 8 | 9 | 10 | 11 | 12 | 13 | 14 | 15 | 0 | ... | ... | ... | ... | ... | ... | ... |
| 9 | 1 | 2 | 3 | 4 | 5 | 6 | 7 | 8 | 9 | | | | | | | 0 |

— Track —

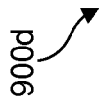

EFFICIENT REWRITE TECHNIQUE FOR TAPE DRIVES

BACKGROUND

1. Field of the Invention

This invention relates to magnetic tape recording, and more particularly to apparatus and methods for efficiently rewriting data to magnetic tape.

2. Background of the Invention

For many years, tape storage has offered advantages in terms of cost and storage density compared to other storage technologies, such as disk storage. Typical applications of tape storage include back-up and archival storage applications. These applications typically require a very high degree of reliability when accessing the data on read-back. An important feature to provide this high reliability is the so-called read-while-write operation of the tape drive. During the read-while-write operation, faulty ECC-protected data segments (referred to hereinafter as faulty "code-word interleaves", or "CWIs") are rewritten to assure that the data is correctly written during the write process. This feature is important because it significantly improves the reliability of the write operation.

In LTO-5 and previous LTO and enterprise-level tape drive standards, rewrites are performed based on a strategy similar to that illustrated in FIG. 1. As shown in FIG. 1, sets 106a of CWIs 100 are written simultaneously across multiple tracks 102 on the magnetic tape medium 104. When one of the CWIs 100a is faulty (as shown by the CWI 100a with black fill) the entire CWI set 106a is rewritten within the data set 108 a short distance from the initial CWI set 106a where the faulty CWI 100a was detected. For example, where the tape medium 104 includes sixteen tracks 102, a rewrite is performed when at least one of the sixteen CWIs 100 that are written concurrently to the sixteen tracks 102 is faulty. In the illustrated example, all sixteen concurrently written CWIs 100 are rewritten (as shown by the CWI set 106b with grey fill) a short distance from the initial CWI set 106a.

The rewrite strategy described above suffers from various shortcomings. First, in the event one or more tracks 102 are dead (either permanently or temporarily), the rewrite scheme results in an intolerable rewrite overhead of at least one hundred percent, since each set 106 of CWIs 100 is written at least twice (once for the initial write 106a and once for the rewrite 106b). This results in a dramatic loss of tape cartridge capacity. Second, the rewrite scheme does not preserve spacing properties of ECC-protected CWIs 100. As a result, the error-correction coding (ECC) may operate in conditions that are worse than what it was designed for. Finally, in the case where there are relatively few random faulty CWIs 100a, rewriting all sixteen CWIs 100—most of which are good and need no rewriting—is not efficient. This efficiency gets worse if the number of parallel tracks 102 is increased, such as from sixteen to thirty-two or more.

In view of the foregoing, what are needed are apparatus and methods to more efficiently rewrite faulty data segments (or CWIs) on magnetic tape. Ideally, such apparatus and methods would maintain sufficient spacing between the rewritten data segments so that the ECC will adequately protect the data contained therein. Yet further needed are apparatus and methods that will maintain the rewrite efficiency when the number of tracks on the magnetic tape is increased.

SUMMARY

The invention has been developed in response to the present state of the art and, in particular, in response to the problems and needs in the art that have not yet been fully solved by currently available apparatus and methods. Accordingly, the invention has been developed to provide apparatus and methods to more efficiently rewrite data to magnetic tape. The features and advantages of the invention will become more fully apparent from the following description and appended claims, or may be learned by practice of the invention as set forth hereinafter.

Consistent with the foregoing, a method for efficiently rewriting data to tape is disclosed herein. In one embodiment, such a method includes writing a data set to tape, the data set comprising S sub data sets of fixed size, each sub data set comprising N code word interleaves (CWIs). The method further includes reading the data set while writing it to the tape to identify faulty CWIs. While reading the data set, the method buffers the faulty CWIs (such as by storing, identifying, and/or marking the faulty CWIs) for later retrieval. When the end of the data set is reached, the method writes corrected versions of the faulty CWIs to the end of the data set.

A corresponding apparatus is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 9 shows one example of a rewrite table based on T=16 logical tracks, S=32 SDSs, and S=32 buffers;

FIG. 10 shows one example of a rewrite table based on T=32 logical tracks, S=64 SDSs, and S=64 buffers;

FIG. 12 shows one example of a rewrite table based on T=16 logical tracks, S=32 SDSs, and S/2=16 buffers;

FIG. 13 shows one example of a rewrite table based on T=32 logical tracks, S=64 SDSs, and S/2=32 buffers; and FIG. 14 shows one example of a rewrite table based on T=32 logical tracks, S=64 SDSs, and S/4=16 buffers.

DETAILED DESCRIPTION

Figure 1:
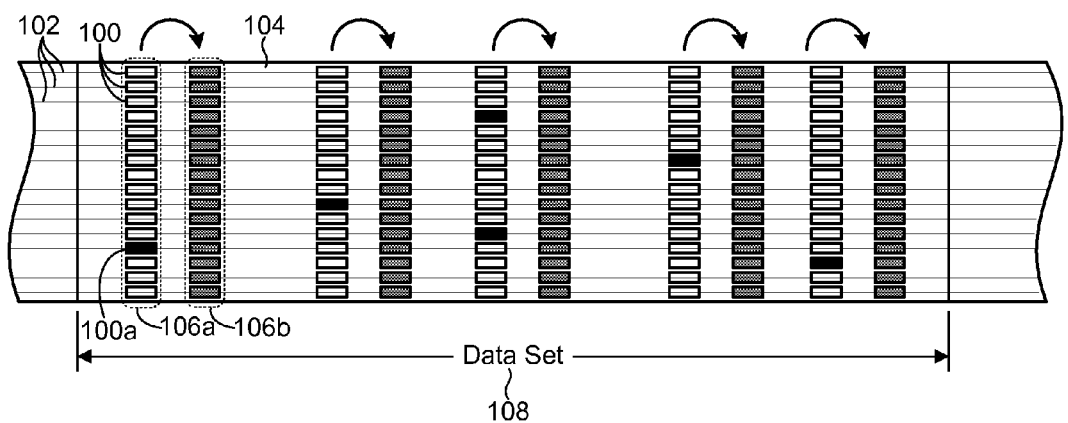
FIG. 1 is a high-level block diagram showing one prior art technique for rewriting data to magnetic tape.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining both software and hardware elements. Each of these embodiments may be represented by one or more modules or blocks. Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
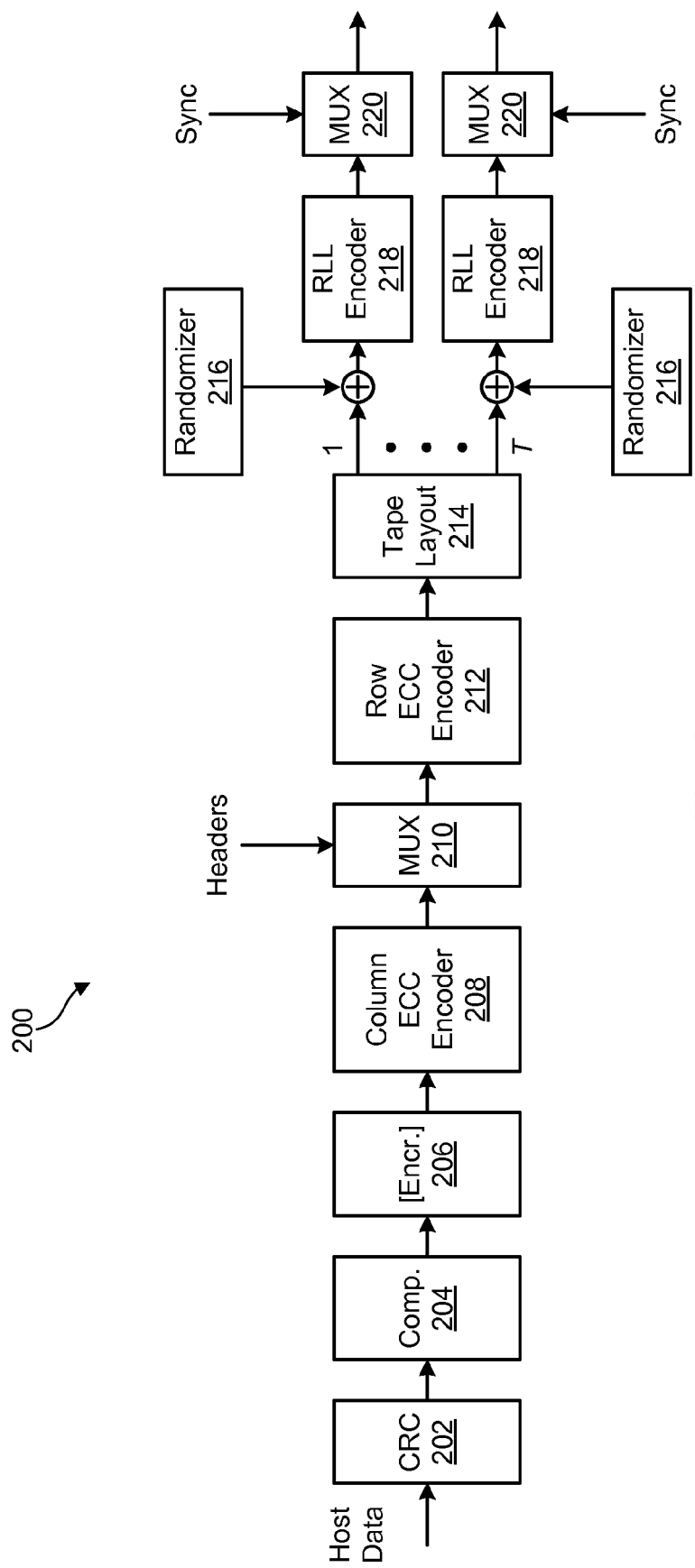
FIG. 2 is a high-level block diagram showing one example of a data flow for a tape drive.

Referring to FIG. 2, a high-level block diagram showing one embodiment of a data flow 200 for a tape drive is illustrated. This data flow 200 is presented only by way of example and is not intended to be limiting. Indeed, tape drives implementing other data flows 200 may also benefit from the rewrite techniques disclosed herein and thus are intended to be encompassed within the scope of the invention. The data flow 200 is simply presented to show one embodiment of a process for recording data to magnetic tape 104.

As shown in FIG. 2, a CRC module 202 receives a sequence of bytes contained within variable-length blocks of data (also known as "records") from a host device. These blocks of data may be any size up to a maximum size supported by a tape drive. The CRC module 202 may add CRC information to these blocks. A compression module 204 may then compress the blocks and an encryption module 206 may optionally encrypt the blocks. The blocks of data may then be broken into data sets of fixed size, which may in turn be broken into sub data sets (SDSs) of fixed size. Each SDS may be organized into a two-dimensional array of data and passed to a column ECC encoder 208. The column ECC encoder 208 may then generate ECC parity for each column in the data array and append the column ECC parity to the array.

Once the column ECC parity is generated and appended to the array, a multiplexer 210 may append headers to the rows in the array. These headers may identify the location of the rows within the sub data set and larger data set in which they reside. The extended array may then be passed to a row ECC encoder 212 which generates row ECC parity for each row in the array. A tape layout module 214 may then distribute the data array, the ECC parity, and the headers across different tracks and in different orders for recording on the magnetic tape 104. The data sequences may then be processed by randomizers 216 which perform additional signal processing on the data. Run length encoders 218 may then transform the spectra of the information so that it is better suited for magnetic recording. Multiplexers 220 may multiplex synchronization information, such as variable frequency oscillators (VFOs), sync characters, or the like, into the information to enable it to be synchronized when read. The resulting data may then be sent to write drivers (not shown) which may cause current to flow through recording head elements to generate magnetic flux and thereby write the data to the magnetic recording medium. In general, each of the blocks or modules to the right of the row ECC encoder 212 perform different transformations on the data to make it more suitable for magnetic recording.

Figure 3:
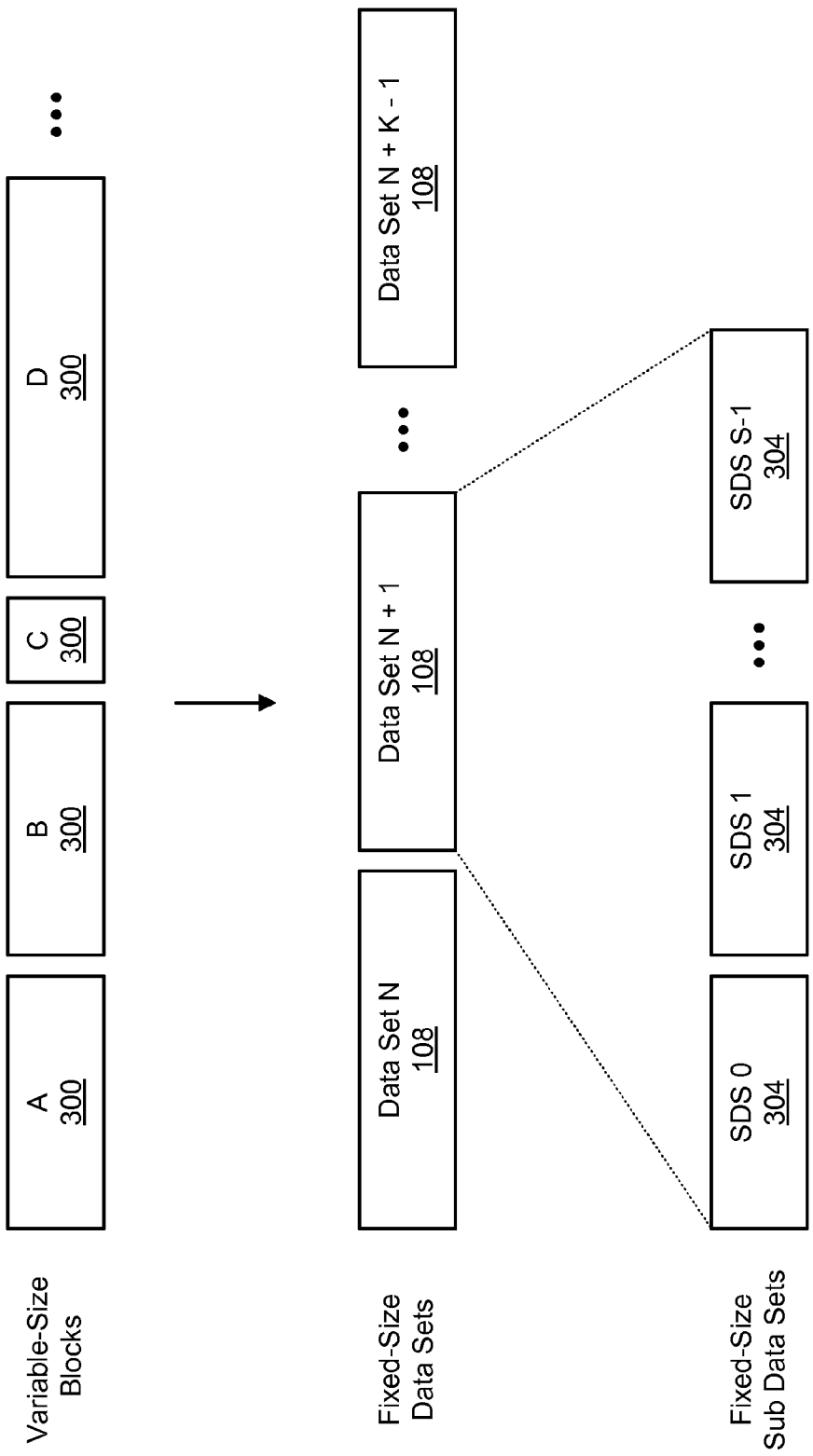
FIG. 3 is a high-level block diagram showing variable-sized blocks of data from a host broken into fixed-sized data sets, and then into smaller fixed-size sub data sets.

Referring to FIG. 3, as explained above, a tape drive may be configured to allocate incoming variable-length blocks 300 of data into data sets 108 of fixed size prior to recording the data on tape 104. The number of bytes in a data set 108 is typically drive technology dependent and is not visible to the host. The incoming host data begins filling the first data set 108 at the first byte of the data set 108 and continues to the last byte of the data set 108, then into subsequent data sets 108, as needed. In certain cases, tape drives may combine multiple small host records 300 into a single data set 108, or may generate multiple data sets 108 from large host records 300. As explained above, each data set 108 contains some number S of smaller fixed-size data entities referred to as sub data sets 304 (SDSs).

Figure 4:
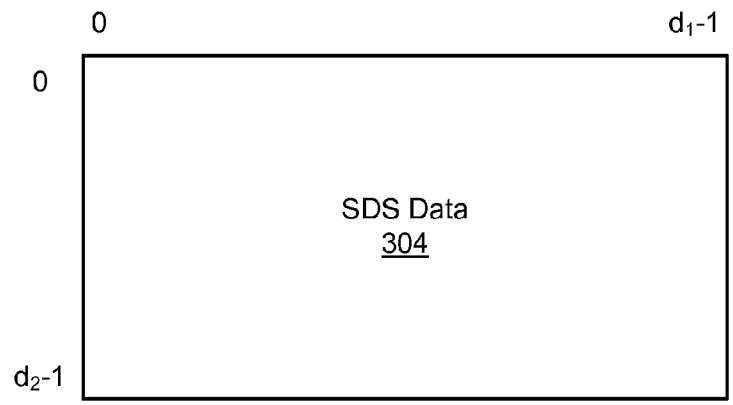
FIG. 4 is a high-level block diagram showing the data of a sub data set (SDS) organized into a two-dimensional data array.

Referring to FIG. 4, a high-level block diagram of a sub data set (SDS) 304 is illustrated. As shown, the SDS 304 is organized into a matrix of $d_2$ rows and $d_1$ columns. The data from a data set 108 may fill the SDS 304 row by row, beginning at row 0, byte 0, and continuing through row $d_2-1$, byte $d_1-1$.

Figure 5:
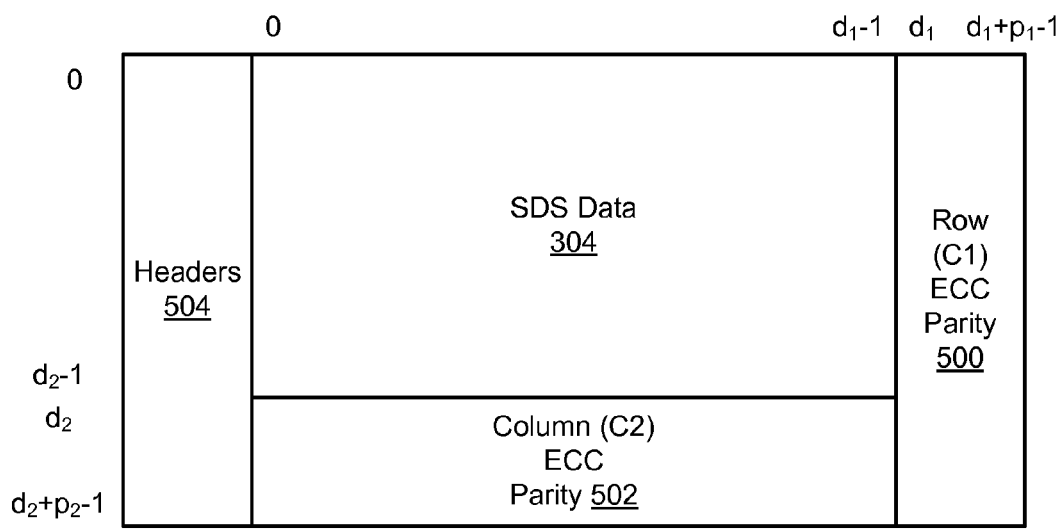
FIG. 5 is a high-level block diagram showing ECC codes appended to the SDS data array of FIG. 4, wherein each row of the extended ECC-protected data array is a codeword interleave (CWI)

As shown in FIG. 5, $p_2$ column ECC parity bytes 502 (also known as "C2" parity) are added to each column in the SDS array 304, and after appending headers 504 to each row, $p_1$ row ECC parity bytes 500 (also known as "C1" parity) are added to each row in the SDS array 304. The row ECC parity 500 protects each row of the SDS array 304 while the column ECC parity 502 protects each column in the SDS array 304 with the exception of the appended header part 504. Each SDS row, including the rows of column ECC parity data 502, may be considered a C1 codeword. In selected embodiments, the row ECC parity 500 and/or column ECC parity 502 are made up of Reed-Solomon codes.

In selected embodiments, each row contains multiple C1 codewords interleaved in some manner. Thus, for the purposes of this description, each row of the ECC-protected SDS array 504 will be referred to hereinafter as a codeword interleave (CWI), where the CWI 100 includes at least one codeword. Each column of the ECC-protected SDS array 504 may be referred to as a C2 codeword. Each SDS 304 is an independent ECC-protected entity, meaning that the C1 ECC parity 500 and the C2 ECC parity 502 for an SDS 304 protects that SDS 304 only. A data set 108 comprises S SDSs 304, each of which contains $N=d_2+p_2$ CWIs 100. Thus, the number of CWIs 100 in a data set 108 is $Q=N \times S$.

Figure 6:
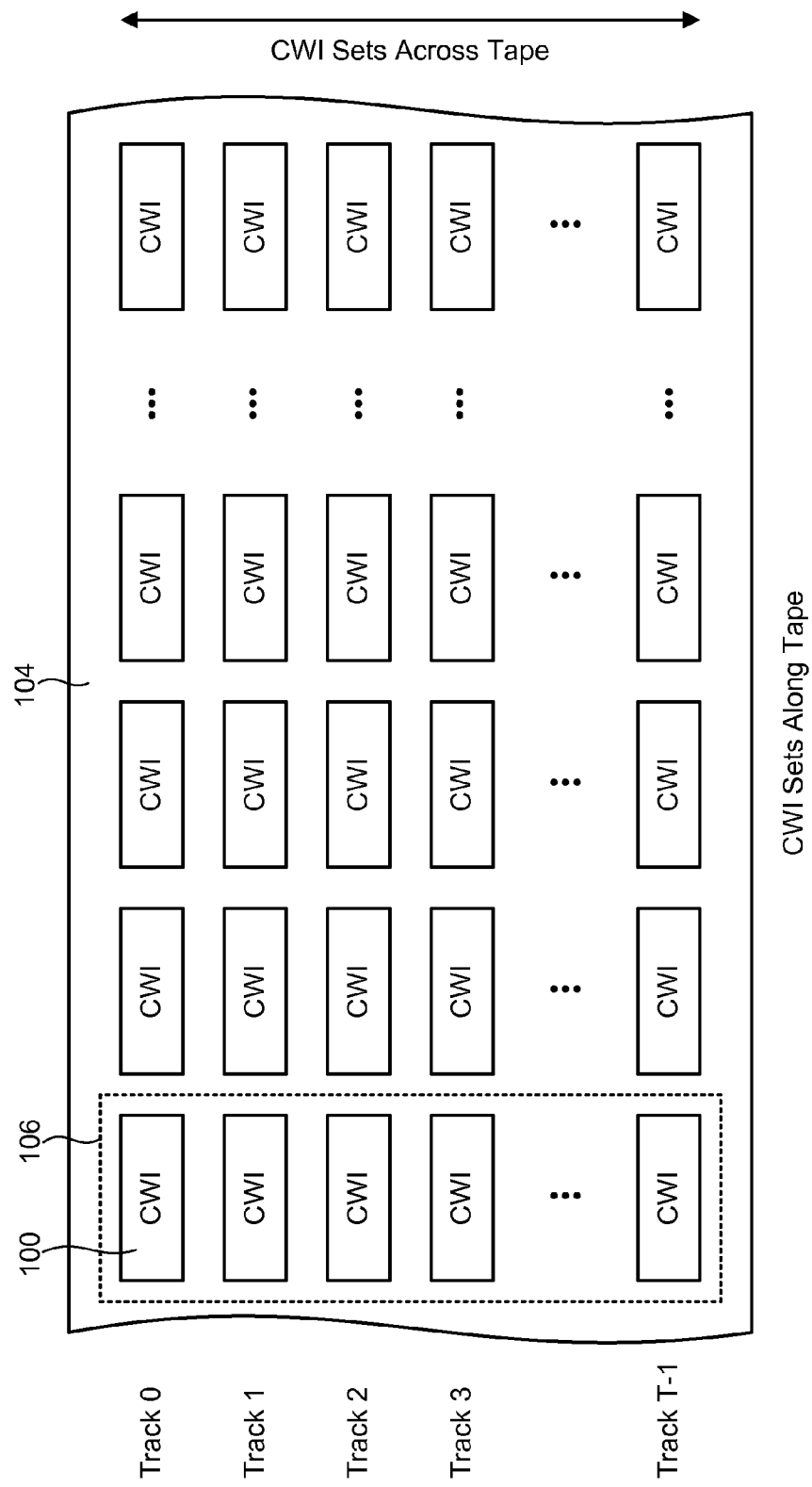
FIG. 6 is a high-level block diagram showing one example of a technique for laying out CWIs on magnetic tape.

Referring to FIG. 6, a high-level block diagram showing one example of a technique for laying out CWIs 100 on magnetic tape 104 is illustrated. In general, most tape drives read and/or write multiple longitudinal tracks 102 (e.g., 8, 16, or 32 tracks) on magnetic tape 104 simultaneously. In doing so, the CWIs 100 of a data set 108 are written onto the tape 104. For a recording format with T simultaneously recorded tracks 102, T CWIs 100 are written simultaneously, one CWI 100 per track 102. The group of simultaneously written CWIs 100 is referred to herein as a CWI set 106. As the tape head moves along the magnetic tape 104, CWI sets 106 are read from or written to the tape 104.

To ensure good performance of the C2 ECC parity 502, the CWIs 100 from the same SDS 304 should be spaced apart from one another in the tape layout of the data set 108. The physical distribution of the CWIs 100 from each SDS 304 will ideally decorrelate error locations on the magnetic tape 104 from the error locations within each SDS 304. The spacing property should be maintained as much as possible during rewrites and may be particularly important if a relatively large part of the data is rewritten, such as occurs with a dead track.

Figure 7:
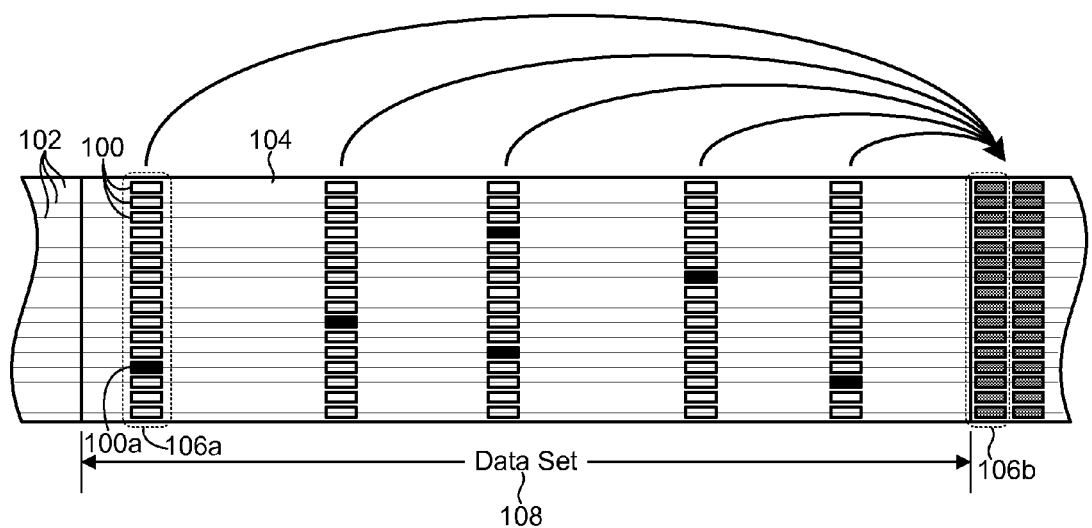
FIG. 7 is a high-level block diagram showing an improved technique for rewriting data on magnetic tape.

Referring to FIG. 7, a high-level block diagram showing an improved technique for rewriting data on magnetic tape 104 is illustrated. This technique overcomes many of the shortcomings of the prior art rewrite technique described in association with FIG. 1. Instead of rewriting an entire CWI set 106b within a short distance from an initial CWI set 106a where a faulty CWI 100a is detected, as described in FIG. 1, the improved rewrite technique identifies faulty CWIs 100 in the data set 108 and then rewrites the faulty CWIs in one or more CWI sets 106b at the end of the data set 108. Using this technique, a large pool of faulty CWIs 100 may be created at the end of the data set 108. The rewriting may also be performed in such a way that it preserves a predetermined minimum spacing between CWIs 100 that are from the same SDS 304. This may be accomplished using special rewrite tables 900 for rewriting the faulty CWIs 100 at the end of a data set 108. Several examples of such rewrite tables 900 will be described in association with FIGS. 9, 10, 12, 13, and 14. These rewrite tables 900 ensure that a minimum spacing is maintained between CWIs 100 from the same SDS 304, thereby providing good ECC performance for the rewritten CWIs 100.

Figure 8:
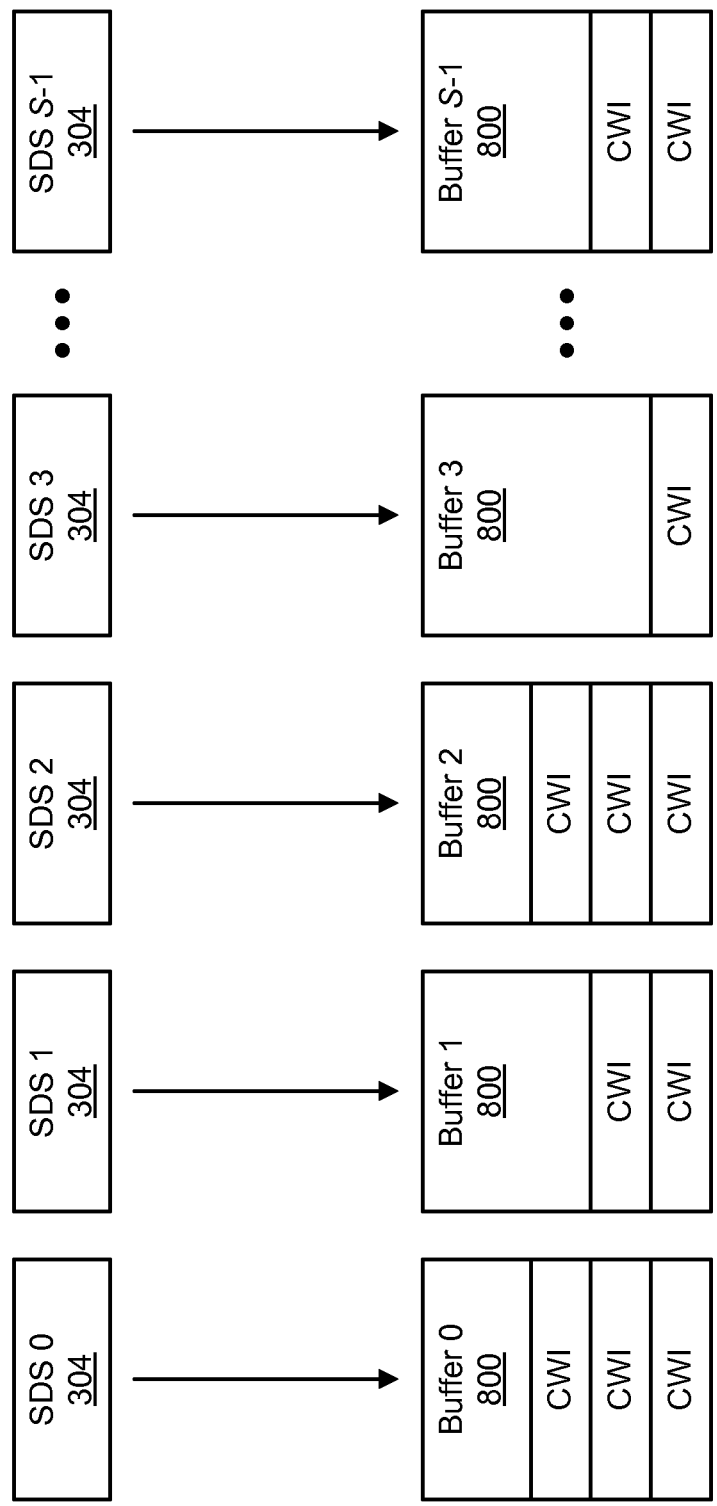
FIG. 8 is a high-level block diagram showing one embodiment of various buffers used to record faulty CWIs from the SDSs of a data set, wherein the number of buffers is equal to the number of SDSs.

Referring to FIG. 8, in order to provide the benefits described above in association with FIG. 7, the improved rewrite technique may utilize a number of buffers 800, such as a number of first-in/first-out (FIFO) buffers 800. In selected embodiments, the rewrite technique utilizes S buffers 800, namely one buffer 800 per SDS 304 in a data set 108. In other embodiments, other numbers of buffers 800, such as S/2 or S/4 buffers 800, may be utilized.

During the read-while-write process of a data set 108 with S SDSs 304, the faulty CWIs 100 from the S SDSs 304 may be assigned to the S buffers 800. More specifically, a faulty CWI 100 that belongs to an SDS 304 numbers, where $0 \leq s < S$, may be assigned to the $s^{th}$ buffer 800. Thus, a faulty CWI from SDS 0 may be assigned to Buffer 0, a faulty CWI from SDS 1 may be assigned to Buffer 1, a faulty CWI from SDS 2 may be assigned to Buffer 2, and so forth. This will allow all of the faulty CWIs 100 from the data set 108 to accumulate in the various buffers 800. Since the number of errors that occur in each SDS 304 may differ, the number of faulty CWIs 100 that are recorded in each buffer 800 may also differ, as illustrated in FIG. 8.

Once the end of the data set 108 is reached, the faulty CWIs 100 identified in the buffers 800 may be rewritten at the end of the data set 108 in accordance with a specific rewrite table 900, several examples of which are illustrated in FIGS. 9 and 10. These rewrite tables 900 may be designed to ensure that CWIs 100 from the same SDS 304 are sufficiently spaced apart to maintain good ECC performance. If, during rewriting and the continuing read-while-write operation, a rewritten CWI 100 is detected as faulty, it may again be assigned to the appropriate buffer 800 and rewritten another time. The rewriting may proceed until all of the buffers 800 are empty.

If a buffer 800 runs out of data during the rewrite, a CWI 100 may be selected from another non-empty buffer 800 in accordance with a predetermined fill policy. Alternatively, dummy data or no data at all may be written to tape 104 when a buffer 800 runs out of data and other buffers 800 are still not empty. Other fill policies are possible and within the scope of the invention.

FIG. 9 shows one example of a rewrite table 900a for a tape recording format that include T=16 logical tracks and S=32 SDSs per data set. In this example, there are S=32 buffers, meaning that there is one buffer 800 for each SDS 304 in the data set 108. The track number is listed horizontally across the top of the table 900a and the CWI set number is listed vertically along the left-hand side of the table 900a. Each number in the table 900a identifies the buffer 800 from which a CWI 100 is taken and rewritten to the tape 104. The number "0" is in bold to highlight the distance between CWIs 100 from the same SDS 304, in this case SDS 0. As can be observed, a large distance is provided between CWIs 100 of the same SDS 304 to preserve ECC performance.

The even CWI sets 106 in the rewrite table 900a contain even buffer numbers and the odd CWI sets 106 contain odd buffer numbers. Using the track rotation illustrated in FIG. 9, which is seven, the CWI sets 106 repeat every 32 CWI sets. That is, Buffer 0 will fall on track 0 every 32 CWI sets. In selected embodiments, the even and odd CWI sets 106 may be periodically swapped one or more times within the data set 108. That is, the even and odd CWI sets 106 may be swapped such that the even CWI sets 106 contain odd buffer numbers and the odd CWI sets 106 include even buffer numbers. These CWI set swaps can reduce the distance between CWIs 100 of the same SDS 304 at the location of the swap but this reduction is small and should not have a significant effect on ECC performance. In general, for the pattern illustrated in FIG. 9, CWIs 100 from the same SDS 304 are spaced apart seven tracks across the tape 104 and two CWI lengths along the tape 104.

FIG. 10 shows one example of a rewrite table 900b for a tape recording format that include T=32 logical tracks and S=64 SDSs per data set. In this example, there are S=64 buffers—one buffer for each SDS 304 in the data set 108. Like the previous example, the track number is listed horizontally across the top of the table 900b and the CWI set number is listed vertically along the left-hand side of the table 900b. Each number in the table 900b identifies the buffer 800 from which a CWI 100 is taken and rewritten to the tape 104.

The entries in the rewrite tables 900 illustrated in FIGS. 9, 10, 12, 13, and 14 are a function of the CWI set number n and the logical track number t. As illustrated in FIGS. 9 and 10, the entry E(n, t) at row n and column t may be determined as follows:

$$E(n,t) = \mod(\mod(\mod(n,2) + \mod(\lfloor 2T \times n/Q \rfloor, 2), 2) + 2 \times \mod((1-T/2) \times \lfloor n/2 \rfloor + t, T), S)$$

where $\lfloor r \rfloor$ denotes the integer part of a real number r and mod(a, b) denotes the remainder of the division of the integer a by the integer b.

Figure 11:
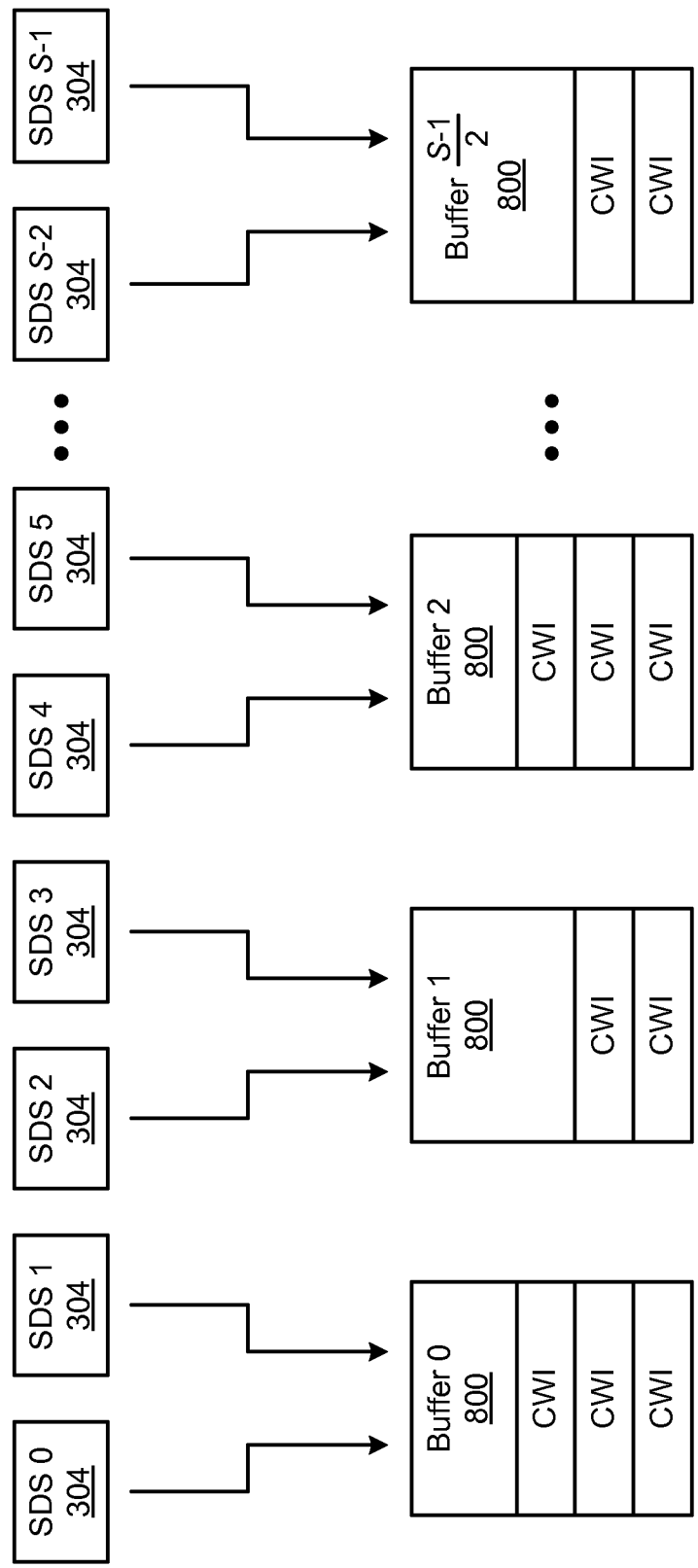
FIG. 11 is a high-level block diagram showing one embodiment of buffers used to record faulty CWIs from the SDSs of a data set, wherein the number of buffers is half the number of SDSs.

Referring to FIG. 11, as previously mentioned, in certain embodiments the improved rewrite technique may utilize a number of buffers 800 different from the number of SDSs 304 in a data set 108. FIG. 11 illustrates a rewrite technique which utilizes S/2 buffers 800, namely one buffer 800 for each pair of SDSs 304 in the data set 108. During the read-while-write process, the faulty CWIs 100 from the S SDSs 304 may be assigned to the S/2 buffers 800. In particular, a faulty CWI that belongs to the SDS number s, where 0≦s<S, may be assigned to buffer number $\lfloor s/2 \rfloor$, where $\lfloor r \rfloor$ denotes the integer part of a real number r. Thus, faulty CWIs from SDS 0 and SDS 1 may be assigned to Buffer 0, faulty CWIs from SDS 2 and SDS 3 may be assigned to Buffer 1, faulty CWIs from SDS 4 and SDS 5 may be assigned to Buffer 2, and so forth.

Once the end of the data set 108 is reached, the faulty CWIs 100 identified in the buffers 800 may be rewritten at the end of the data set 108 in accordance with a specific rewrite table 900, several examples of which are illustrated in FIGS. 12 and 13. The rewrite tables 900 are designed to ensure that CWIs 100 from the same SDS 304 are sufficiently spaced apart to maintain good ECC performance.

FIG. 12 shows one example of a rewrite table 900c for a tape recording format that includes T=16 logical tracks and S=32 SDSs per data set. In this example, there are S/2=16 buffers, meaning that there is one buffer for each pair of SDSs 304 in the data set 108. The track number is listed horizontally across the top of the table 900b and the CWI set number is listed vertically along the left-hand side of the table 900b. Each number in the table 900c identifies the buffer 800 from which a CWI 100 is retrieved and rewritten to the tape 104. The number "0" is in bold to highlight the spacing between CWIs 100 from the same buffer 800, in this example Buffer 0 which contains CWIs from SDS 0 and SDS 1.

As shown in FIG. 12, each CWI set 106 in the rewrite table 900c includes CWIs 100 from all buffers 800. Each CWI set 106 is rotated by seven tracks relative to the previous CWI set 106, thereby providing generous spacing between CWIs 100 of the same SDS 304. Because each CWI set 106 includes CWIs 100 from all buffers 800, this pattern repeats every sixteen CWI sets 106. It is worth noting that this type of pattern is very simple to implement in hardware.

FIG. 13 shows one example of a rewrite table 900d based on T=32 logical tracks, S=64 SDSs, and S/2=32 buffers. Like the rewrite table 900c described in FIG. 12, there is one buffer 800 for each pair of SDSs 304 in a data set 108. FIG. 14 shows one example of a rewrite table 900e based on T=32 logical tracks, S=64 SDSs, and S/4=16 buffers. In this example, there is one buffer 800 for each four SDSs 304 in a data set 108. Thus, SDS 0, SDS 1, SDS 2, and SDS 3 would be assigned to Buffer 0; SDS 4, SDS 5, SDS 6, and SDS 7 would be assigned to Buffer 1; and so forth. The bolded number "0" shows the spacing between CWIs 100 assigned to the same buffer 800, in this example Buffer 0.

In certain embodiments (not shown), a single buffer 800 may be used to store faulty CWIs 100 from all SDSs 304 in a data set 108. In such an embodiment, the faulty CWIs 100 may be rewritten out of the single buffer 800 in batches of T=16 or T=32, depending on the number of tracks T. If the number of rewrites is not a multiple of T, the last batch may contain multiple instances of certain CWIs 100 to generate a CWI set 106 with T CWIs 100. The manner in which the CWIs 100 are repeated in the last batch may be established by a predetermined fill policy.

The improved rewrite technique described in association with FIGS. 7 through 14 may provide the following benefits compared to conventional rewrite techniques: First, the improved rewrite technique addresses the dead track problem in an optimal manner. More specifically, in the case of a dead track, there will be N×S/T faulty CWIs 100 per data set 108 that need to be rewritten at the end of the data set 108. Each of these CWIs 100 will be evenly distributed over the available number of buffers 800, which also applies to faulty CWIs 100 that are rewritten to the dead track. Second, for random errors, the efficiency is also increased since the rewrite is performed at the end of a data set 108. In particular, there is a larger probability that the CWIs 100 to be rewritten are evenly distributed over the available buffers 800 than when they were rewritten using a conventional tape recording format such as LTO-5. Third, in the case of stripe errors across all T logical tracks 102, the improved rewrite technique also achieves optimal efficiency. Fourth, the improved rewrite technique offers the flexibility to choose higher rewrite efficiency (by using fewer buffers 800) at the cost of some loss in the spacing property between CWIs 100 of the same SDS 304. Fifth, for rewrites based on the rewrite tables 900a, 900b illustrated in FIGS. 9 and 10, the improved rewrite technique improves the spacing property of CWIs 100 compared to LTO-based rewrite techniques. Thus, the ECC performance will be at least as good or better than conventional LTO-based rewrite techniques.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for efficiently rewriting data to tape, the method comprising:
    writing a data set to tape, the data set comprising S sub data sets of fixed size, each sub data set comprising N code word interleaves (CWIs);
    reading the data set while writing it to the tape to identify faulty CWIs;
    buffering the faulty CWIs while writing the data set; and
    writing corrected CWIs associated with the faulty CWIs to the end of the data set, wherein writing the corrected CWIs to the end of the data set comprises providing spatial separation between CWIs of the same sub data set such that CWIs of the same sub data set are not adjacent to one another.

2. The method of claim 1, wherein writing the corrected CWIs comprises writing the corrected CWIs in such a way that the distances between corrected CWIs of the same sub data set are substantially maximized.

3. The method of claim 1, wherein writing the corrected CWIs comprises combining the corrected CWIs into at least one CWI set, and writing the least one CWI set to the end of the data set.

4. The method of claim 1, wherein buffering the faulty CWIs comprises storing the faulty CWIs in S/X buffers, where X is an integral divisor of S.

5. The method of claim 4, where X is equal to one of 1, 2, 4, and 8.

6. The method of claim 4, wherein the faulty CWIs from the $s^{th}$ sub data set, where $0 \leq s < S$, are stored in the $\lfloor s/X \rfloor^{th}$ buffer, where $\lfloor r \rfloor$ denotes the integer part of a real number r.

7. The method of claim 6, wherein the location that a corrected CWI is written to the tape is at least partly a function of the buffer that it is contained in, the logical track it is written on, and its position down-track.

8. The method of claim 4, wherein the buffers are FIFO buffers.

9. The method of claim 1, wherein the CWIs are written across T tracks on the tape, and the number of sub data sets S in the data set is a multiple of T.

10. The method of claim 9, wherein the number of tracks T is equal to $2^k$, where k is an integer greater than or equal to one.

11. An apparatus for efficiently rewriting data to tape, the apparatus comprising:
    a tape drive configured to write a data set to tape, the data set comprising S sub data sets of fixed size, each sub data set comprising N code word interleaves (CWIs);
    the tape drive further configured to read the data set while writing it to the tape to identify faulty CWIs;
    the tape drive further configured to buffer the faulty CWIs while writing the data set; and
    the tape drive further configured to write corrected CWIs associated with the faulty CWIs to the end of the data set, wherein writing the corrected CWIs to the end of the data set comprises providing spatial separation between CWIs of the same sub data set such that CWIs of the same sub data set are not adjacent to one another.

12. The apparatus of claim 11, wherein the tape drive is further configured to write the corrected CWIs in such a way that the distances between corrected CWIs of the same sub data set are substantially maximized.

13. The apparatus of claim 11, wherein the tape drive is further configured to combine the corrected CWIs into at least one CWI set, and write the least one CWI set to the end of the data set.

14. The apparatus of claim 11, wherein the tape drive is further configured to store the faulty CWIs in S/X buffers, where X is an integral divisor of S.

15. The apparatus of claim 14, where X is equal to one of 1, 2, 4, and 8.

16. The apparatus of claim 14, wherein the tape drive is further configured to store the faulty CWIs from the $s^{th}$ sub data set, where $0 \leq s < S$, in the $\lfloor s/X \rfloor^{th}$ buffer, where $\lfloor r \rfloor$ denotes the integer part of a real number r.

17. The apparatus of claim 16, wherein the location that a corrected CWI is written to the tape is at least partly a function of the buffer that it is contained in, the logical track it is written on, and its position down-track.

18. The apparatus of claim 14, wherein the buffers are FIFO buffers.

19. The apparatus of claim 11, wherein the CWIs are written across T tracks on the tape, and the number of sub data sets S in the data set is a multiple of T.

20. The apparatus of claim 19, wherein the number tracks T is equal to $2^k$, where k is an integer greater than or equal to one.

* * * * *